United States Patent
Frankel

(10) Patent No.: US 7,080,593 B1
(45) Date of Patent: Jul. 25, 2006

(54) CONTROLLED COOKING SYSTEM

(76) Inventor: David Frankel, 1942 Pelham Ave., Los Angeles, CA (US) 90025

(*) Notice: Subject to any disclaimer, the term of this patent is extended or adjusted under 35 U.S.C. 154(b) by 188 days.

(21) Appl. No.: 10/678,881

(22) Filed: Oct. 2, 2003

Related U.S. Application Data

(60) Provisional application No. 60/416,120, filed on Oct. 4, 2002.

(51) Int. Cl.
*A47J 37/00* (2006.01)
*A47J 37/04* (2006.01)

(52) U.S. Cl. .......................... 99/326; 99/39 R; 99/333; 99/338; 219/494; 219/497; 340/870.17

(58) Field of Classification Search .................. 99/326, 99/329 R, 331, 333, 338; 219/626, 620, 219/665, 497, 494, 501, 435; 340/870.17, 340/870.16
See application file for complete search history.

(56) References Cited

U.S. PATENT DOCUMENTS

| | | | |
|---|---|---|---|
| 4,381,438 A * | 4/1983 | Goessler et al. | 219/627 |
| 4,587,406 A * | 5/1986 | Andre | 219/497 |
| 5,951,900 A * | 9/1999 | Smrke | 219/497 |
| 6,320,169 B1 * | 11/2001 | Clothier | 219/626 |
| 6,539,842 B1 * | 4/2003 | Chapman et al. | 99/342 |

FOREIGN PATENT DOCUMENTS

JP 87135 * 4/2005

* cited by examiner

*Primary Examiner*—Reginald L. Alexander
(74) *Attorney, Agent, or Firm*—Martin Novack

(57) ABSTRACT

A controlled cooking system (CCS) that monitors, measures, and controls the internal temperature of foods placed in an oven having a Radio Frequency Identification (RFID) antenna(s), a transmitter/receiver/interrogator/reader/microprocessor (TRIRM) module and an RFID tag with built-in temperature sensor. The RFID tag is buried in the food being cooked and is energized and enabled by an RF signal of pre-determined frequency. The tag output is an RF "backscatter signal" having encoded temperature data indicative of the internal temperature of the food that the tag is buried in. The backscatter signal is received and decoded by the antenna(s) and the TRIRM module incorporating a programmed cooking/baking temperatures for various foods. If the decoded temperature is below a user-set temperature, the TRIRM module allows the oven to remain on. Conversely, if the decoded temperature is at or exceeds the user-set temperature, the TRIRM module shuts off the oven and produces a signal that activates an alarm indicating that the cooking has been terminated.

17 Claims, 2 Drawing Sheets

CONTROLLED COOKING SYSTEM

This application claims priority of Provisional Patent Application No. 60/416,120 dated Oct. 4, 2002.

TECHNICAL FIELD

The invention pertains to the general field of food-cooking ovens and more particularly to a controlled cooking system that monitors, measures and controls the internal temperature of food(s) being cooked or baked. The system automatically shuts off the oven and sounds an alarm when a preset internal temperature has been attained, thus indicating that the cooking cycle has been completed.

BACKGROUND ART

The ability to prepare and cook a meal in an oven or rotisserie is not without inherent problems. One such problem is the ability to cook a meal so that the food is not undercooked or overcooked. Because a cook is often busy attending to other cooking duties, the food may not be removed from the oven or rotisserie at an optimum time to assure that the meal is properly cooked. The instant invention is designed to easily solve the cooking temperature and time problems by utilizing a controlled cooking system (CCS). Once an optimized internal temperature for a particular food has been set into the CCS, the food will be automatically cooked until the optimized temperature has been attained. Once the internal temperature is attained, the oven or rotisserie automatically shuts off and alerts the cook by means of an audible or visual alarm that the food has been cooked and is ready to be served.

A search of the prior art did not disclose any patents or industry literature that read directly on the claims of the instant invention.

DISCLOSURE OF THE INVENTION

The controlled cooking system (CCS) is designed to automatically alert a cook that food being cooked in an oven or a rotisserie is sufficiently cooked. The system can be designed to function with either an electric oven, a gas oven or a rotisserie. An internal cooking temperature measurements sensor consisting of a Radio Frequency Identification (RFID) tag with or without anti-collision capability is utilized to measure the internal cooking and baking temperature of food such as beef, poultry, fish, bread, cakes etc. The small RFID tag having a built-in temperature sensor is inserted (a cut is made) into the food that is to be cooked/baked, in such a way that it is buried in the thickest part of the food being cooked or baked. Alternatively, the inherent temperature sensitivity of the tag can be used for sensing the temperature of the item being cooked.

During the operation of a rotisserie or oven, the rotisserie's/oven's built-in tag reader/interrogator/transmit/receive antenna(s), illuminates the RFID tag with constant or intermittent RF waves that allow the interrogator to "read" the encoded temperature information of the food being cooked by decoding it. The tag reader/interrogator "reads" the information from the tag through a method known as "backscatter modulation," RFID operation is well known in the art and therefore is not described in detail. The microprocessor and display are preferably, although not necessarily, built into the oven.

Once the cooked item's internal temperature has reached the temperature that was preset (by the user) in the rotisserie/oven for the item being cooked, the rotisserie/oven shuts itself off and sounds an alarm or rings a phone number or uses the internet to inform a user that the food has been cooked. The built-in microprocessor and firmware runs all the functions of the reader/interrogator/decoder/RF and all other oven functions, like heater duty cycle, time clock display/keypad input function/alpha numerical display etc. The RF frequency employed is 13.56 MHz, or 6.78 MHz ISM band as allocated for RFID functions by a US regulatory authority. The use of any other RF frequency is limited only by the chosen RF frequency penetration into the food that the sensor is inserted in and, the read distance attainable with allowable power/RF frequency, as set by the appropriate country regulatory authorities. The tag is reusable or the oven controls can be set for a one time use only (for sanitary reasons) after which the tag(s) should be disposed of. The tags are encapsulated in a non-toxic heat resistant material, (like glass or glass filled epoxy, Teflon, etc.).

The anti-collision feature is used for cooking or baking more than one item at the same time that require different cooking temperatures, in such a way that the lower cooking temperature item has "shutoff" preference or priority. An air-circulating fan is incorporated in the rotisserie/oven for better uniform cooking convention action (convection oven). The fan can be enabled/disabled if so desired. This application of the RFID temperature sensor system can be applied to all ovens, gas or electric, and all existing ovens can be retrofitted with this system. The user inputs the name of the item to be cooked and the desired "doneness"of the item via the keypad (like chicken, turkey, steak, roast beef, well done, medium, medium rare, etc.).

The alphanumerical panel will display the inputted information and the internal cooking temperature needed to cook the item will be set automatically by built-in fimnware.

In view of the above disclosure, the primary object of the invention is to produce a controlled cooking system (CCS) that automatically allows food placed in an oven to be cooked at a user selected internal temperature. Once the selected internal temperature is attained the CCS automatically shuts off the oven and alerts the cook that the food is ready to be served.

In addition to the primary object of the invention it is also an object of the invention to produce an CCS that:
  can be implemented into various types and sizes of ovens, rotisseries and other like cooking implements,
  optimally and automatically cooks a food at any selected internal temperature to suit the taste of the consumer,
  automatically shuts off and produces an alarm when the cooking cycle has been completed,
  prevents or minimizes salmonella and other food borne diseases, and
  is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
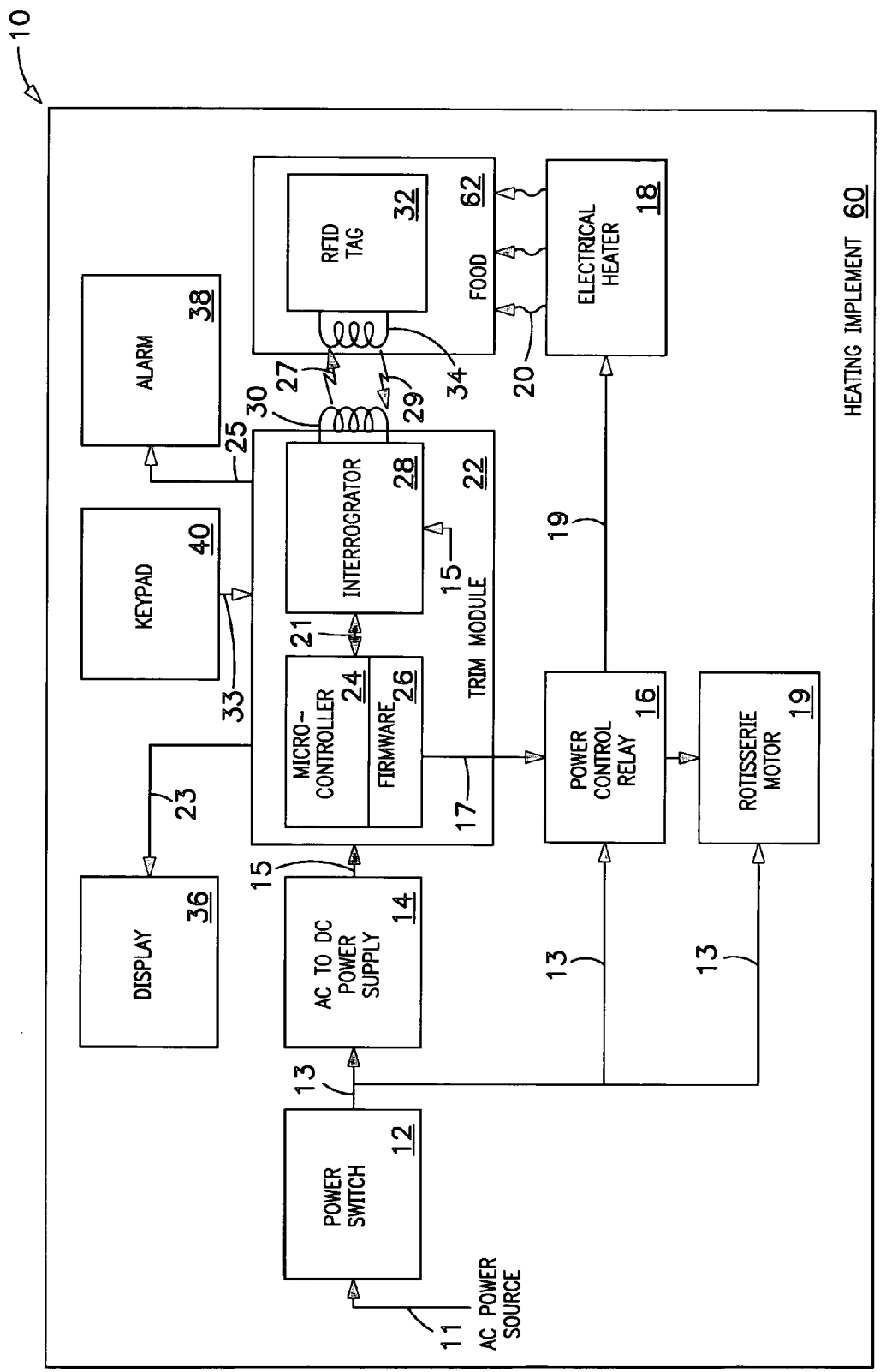
FIG. 1 is a block diagram of a controlled cooking system that operates by using electric heat and electrically operated components.
Figure 2:
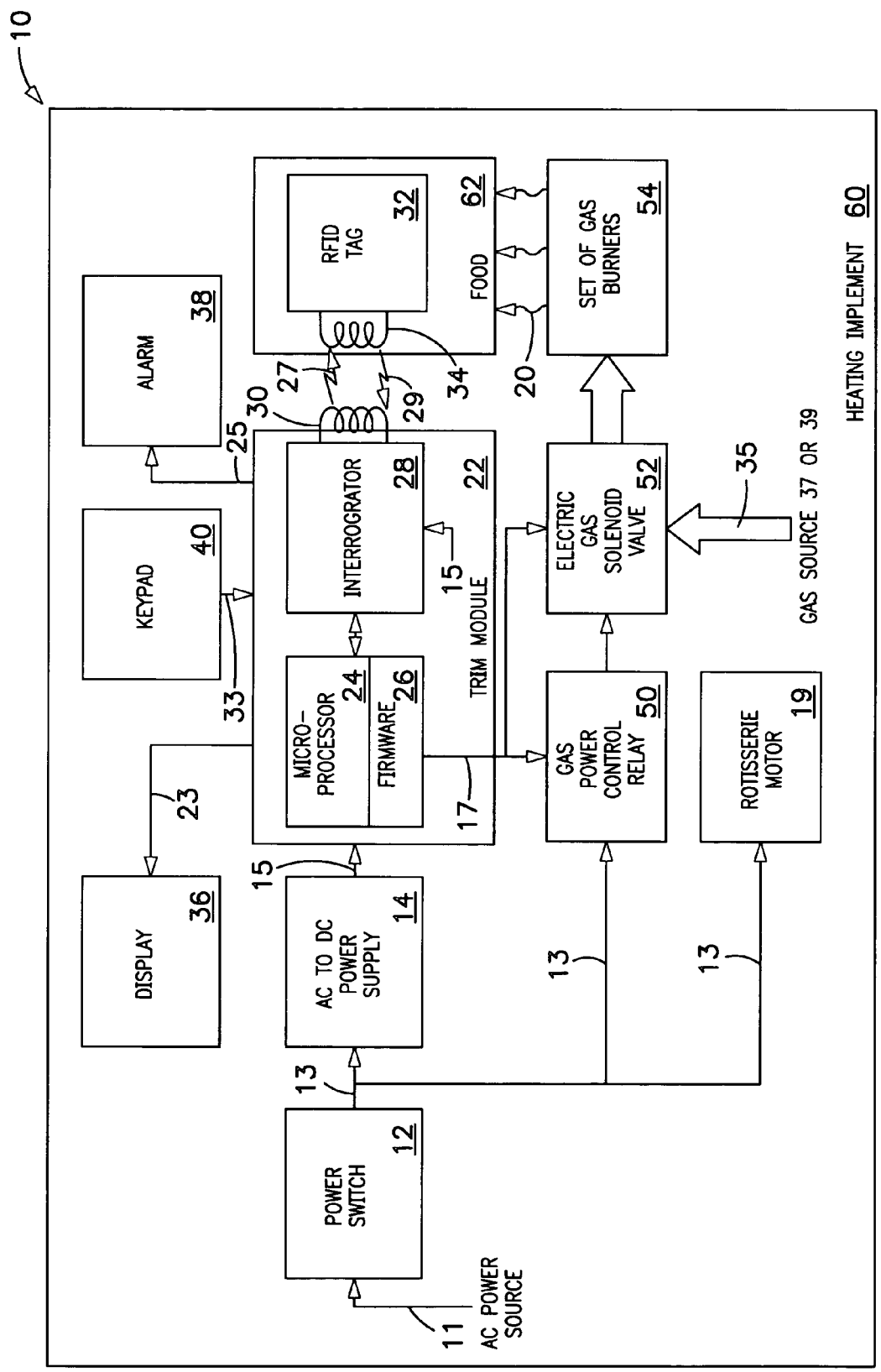
FIG. 2 is a block diagram of a controlled cooking system that operates by using gas heat in combination with electrically operated components.

The best mode for carrying out the invention is presented in terms of a preferred embodiment for a controlled cooking system (hereinafter "CCS 10"). The preferred embodiment of the CCS 10 is described in terms of an all-electric CCS 10, as shown in FIG. 1, and a second embodiment that uses gas heat in combination with electrically operated components, as shown in FIG. 2. The term "food 62" as referred to herein is intended to include beef, poultry, fish, bread, cakes and other cooked or baked foods.

The all-electric CCS 10, as shown in FIG. 1, is comprised of a power control switch 12, an a-c to d-c power supply 14, a power control relay 16, an electric heater 18, a microprocessor 24, an interrogator 28, a passive Radio Frequency Identification (RFID) tag 32 having an internal temperature sensor, a display 36, an alarm 38, and a keypad 40.

The power switch 12 has an input 11 that is connected to a utility power source that can consist of either 120-volts a-c, 220-volts a-c or other voltages, and an output consisting of an a-c voltage 13. The –ac output voltage 13 is connected to the input of the a-c to d-c power supply 14, the power control relay 16 and to the rotisserie motor 19. The output of the power supply 14 is a regulated d-c voltage that is applied to the electronic components consisting of the TRIRM module 22 which includes the microprocessor 24 and the interrogator 28; the passive RFID tag 32, the display 36, the alarm 38 and the keypad 40.

The a-c voltage 13 from the power switch 12 is applied to a first input of the power control relay 16 which energizes the relay. The relay 16 also includes a second input that is applied a power control signal 17 as described infra. The output of the power control relay 16 is a heater a-c voltage 19 that is used to energize the electric heater 18 which supplies the heat 20 to cook the food 62 placed into the cooking implement 60, as shown in FIG. 1.

The application of the heat 20 is controlled by the power control relay 16, which, in turn is controlled by the application of the power control signal 17 that is produced and controlled by the microprocessor 24. The microprocessor 24, as shown in FIG. 1, includes firmware 26 that controls the operation of the microprocessor 24 and ultimately the operation of the CCS 10. The microprocessor 24 provides data pertaining to the internal temperature that is required to optimally cook a particular food 62. The microprocessor 24 has an input that receives an interrogated data signal 21 and is designed to produce three output signals: a first output produces the power control signal 17, a second output produces a display activation signal 23, and a third output produces a cooking terminated/alert signal 25 that activates the alarm 38.

The interrogator 28, as shown in FIG. 1, is designed to activate the RFID tag 32 with RF energy and to extract temperature data from the RFID tag 32. To accomplish this task, the interrogator 28 incorporates an RF transmitter section, a receiving section and data decoding section. The RF transmitter section is comprised of an RF generator, a tuning circuit and a transmit/receive interrogation antenna 30. The tuning circuit and the interrogation antenna 30 are tuned to produce a first output consisting of an RF signal 27 that is emitted via the interrogation antenna 30 and applied to the tag antenna 34 attached to the RFID tag 32, as shown in FIG. 1.

The RFID tag 32 is encapsulated in a non-toxic, heat-resistant material that can be used several times, however for sanitary reasons the tag is preferably designed for a one-time use after which the tag is discarded. The RFID tag 32 is comprised of an LC resonant circuit that functions in combination with a rectifier circuit and an internal temperature sensitive device. When the RF signal 27 from the interrogator 28 passes through the tag antenna 34, an a-c voltage is produced that is subsequently rectified by the rectifier circuit to produce a d-c voltage. The d-c voltage enables the RFID tag 32 with the internal temperature sensitive device, which then produces and applies the encoded temperature via the RF backscatter signal 29, as described infra.

The tag 34 is a part of an antenna circuit that is comprised of an LC resonant circuit that is tuned to receive a preferred operating frequency of 13.56 MHz or 6.78 MHz ISM band which are allocated for RFID functions by a government RF frequency regulating agency. The use of other RF frequencies is limited only by the penetration of the RF signal frequency into the food and the read distance attainable with the power/RF frequency utilized.

The communication between the interrogation antenna 30 and the RFID tag antenna 34 is accomplished by means of near-field magnetic coupling that is present between the two antennas 30,34 through the produced magnetic field. The RFID tag 32 is designed to receive and process the RF signal 27 and to produce and emit via the tag antenna 34, the RF backscatter signal 29 that includes the encoded internal temperature information of the food being cooked. The RF backscatter signal 29 is communicated via the two antennas 30,34 to the first input on the interrogator 28 where the signal 29 is decoded to produce a second output consisting of an interrogated data signal 21 that is then applied to the microprocessor 24 for further processing. If the temperature information included in the interrogated data signal 21 is below the internal temperature preset by the user, the microprocessor 24, via the power control signal 17, allows the heat 20 applied to the cooking implement 60 to remain on. Conversely, when the decoded temperature information in the interrogated data signal 21 is equal to or exceeds the preset internal temperature, the power control signal 17 shuts off the power control relay 16, which then turns off the electric heater 18, thus terminating the cooking cycle.

The microprocessor 24 is also designed to produce the display activation signal 23, which periodically updates the temperature displayed on the display 36. The display 36, in addition to displaying the temperature, can also be designed to display the anticipated time remaining to optimally cook the food or the elapsed cooking time.

The alarm 38, as shown in FIG. 1, is applied the cooking terminated/alert signal 25 by the microprocessor 24 when the preset internal cooking temperature has been met, indicating that the cooking cycle has been completed. The alarm 38 can consist of an audible sound produced by a local or a remote alarm that rings when the cooking cycle is completed or the Internet can be programmed to produce an e-mail when the cooking cycle has been completed.

The final component described for the first embodiment is the keypad 40 which is connected to the third input of the microprocessor 24, via the keypad signal 33, as shown in FIG. 1. The keypad is designed to input various selectable foods by name as programmed in the microprocessor 24.

The second embodiment of the CCS 10 operates with a combination electric-gas oven, as shown in FIG. 2, that utilizes the identical electronic components used in the first embodiment but differs in the non-electric components namely, a gas-power control relay 50, an electric-gas solenoid valve 52, and a set of gas burners 54.

The electric-gas solenoid valve 52 has a gas input that is connected to a gas source provided by either a utility gas source 37 or a portable gas source 39. The gas power control relay 50, in combination with the microprocessor 24, controls the application of the gas source 37,39 to the electric-gas solenoid valve 52. The valve 52, in turn, controls the flow of gas applied to the set of gas burners 54, from where the generated heat 20 cooks the food in the heating implement 60.

While the invention has been described in complete detail and pictorially shown in the accompanying drawings it is not to be limited to such details, since many changes and modifications may be made to the invention without departing from the spirit and the scope thereof. For example, the components of the CCS 10 can be located within the confines of the heating implement 60 or optimally the CCS 10 components, with the exception of the interrogation antenna 30 and the tag antenna 34, can be located outside the confines of the heating implement 60. Also, the electronic components can be integrated into an Application Specific Integrated Circuit (ASIC) to reduce cost and improve the reliability of the CCS 10. The CCS 10 can also be designed to be connected to a portable power source. Hence, it is described to cover any and all modifications and forms which may come within the language and scope of the claims.

The invention claimed is:

1. A controlled cooking system that monitors, measures and controls the internal temperature of foods being cooked or baked, said system comprising:
   a) means for automatically turning on and off a power source to control the application of a heat source applied to a cooking implement, comprised of an oven or rotisserie, wherein when the power source is turned-on, food placed into the cooking implement is heated and cooked,
   b) a passive Radio Frequency Identification (RFID) tag having an integral temperature sensor, encapsulated in a non-toxic, heat resistant material that can be used once and then discarded or used several times before being discarded, wherein said RFID tag is buried into the food that is being cooked or baked, said RFID tag having means for receiving, energizing and enabling RF signals and means for automatically producing an output comprising a backscatter signal containing encoded temperature data indicative of the internal temperature of the food being cooked or baked,
   c) an interrogator having:
      (1) means for producing the RF signals that energizes and enables said RFID tag,
      (2) means for receiving an encoded temperature signal from said RFID tag, and
      (3) means for producing an interrogated data signal that includes decoded temperature data, and
   d) a microprocessor having a programmed temperature data that is indicative of the internal temperature required to optimally cook a particular food, wherein when the decoded temperature data applied from said interrogator is below the programmed temperature, said microprocessor allows said power source applied to said cooking implement to remain on, conversely when the decoded temperature data is equal to or exceeds the programmed temperature, said microprocessor shuts off the power source, thus terminating the cooking cycle;
   said RFID tag further comprising an LC resonant circuit that functions in combination with a rectifier to convert the applied RF signal to a d-c voltage that energizes and enables said RFID tag which then produces the encoded temperature signal that is applied to said interrogator via the RF backscatter signal.

2. The system as specified in claim 1 wherein the power source is comprised of an a-c power source that is applied to said cooking implement by means of a power switch that applies the a-c voltage, via a power control relay, prior to being applied to an electrical heater that heats the food placed into the cooking implement, wherein said power control relay is enabled and disabled by a power control signal produced by said microprocessor.

3. The system as specified in claim 2 wherein said a-c power source is comprised of a utility power source.

4. The system as specified in claim 2 wherein said a-c power source is comprised of a portable power source.

5. The system as specified in claim 1 wherein the signal coupling between said interrogator and said RFID tag is by RF near-field magnetic coupling that is produced by an interrogation antenna located at the input/output of said interrogator and a tag antenna located at the output of said RFID tag.

6. A controlled cooking system that monitors, measures and controls the internal temperature of food being cooked or baked, said system comprising:
   a) a power switch having:
      (1) an input connected to an a-c power source,
      (2) an a-c output,
   b) an a-c to d-c power supply having:
      (1) an input that receives the a-c output from said power switch,
      (2) a d-c output,
   c) a power control relay having:
      (1) a first input that receives the a-c output from said power switch,
      (2) a second input,
      (3) a first a-c output,
      (4) a second a-c output,
   d) an electric heater that receives the first a-c output from said power control relay, wherein the heat produced by said electric heater cooks or bakes the food placed into the cooking implement,
   e) a rotisserie motor that receives the second a-c output from said power control relay,
   f) a microprocessor that is operated by firmware, said microprocessor having:
      (1) a first input consisting of the d-c voltage from said a-c to d-c power supply,
      (2) a second input,
      (3) a third input,
      (4) a first output consisting of a power control signal applied to the second input of said power control relay,
      (5) a second output,
      (6) a third output
   g) an interrogator having:
      (1) an interrogation antenna,
      (2) a first input consisting of the d-c voltage applied from said a-c to d-c power supply,
      (3) a first output consisting of an RF signal that is emitted from said interrogation antenna,
      (4) a second output consisting of an interrogated data signal that is applied to the second input of said microprocessor,
   h) a Radio Frequency Identification (RFID) tag having an internal temperature sensor, wherein said RFID tag is buried into a food that is to be cooked or baked, said RFID tag having:

(1) a tag antenna having an input that receives the RF signal from said interrogator, and
(2) an output consisting of a temperature encoded RF backscatter signal that received by said interrogator via the interrogator antenna.
i) a display that displays alpha-numeric data pertaining to the identification of the food being cooked or baked and the level of preparation from rare to well done, wherein said display is activated by the second output from said microprocessor,
j) an alarm situated locally or remotely that produces an audible sound when the food in the heating implement has been fully cooked or baked, wherein said alarm is activated by the third output from said microprocessor, and
k) a keypad connected to the third input on said microprocessor, wherein said keypad having means for selecting various foods by their name as programmed in said microprocessor.

7. The system as specified in claim 6 wherein the input a-c power source can consist of either 120 volts a-c or 220 volts a-c.

8. The system as specified in claim 7 wherein the operation of said power control relay is controlled by said microprocessor, wherein when the cooking cycle has been completed, as determined by an internal temperature programmed for each food into said microprocessor, the microprocessor commands said power control relay, to terminate the power applied to said electric heater.

9. The system as specified in claim 6 wherein said interrogator functions to activate and extract temperature data from said RFID tag.

10. The system as specified in claim 6 wherein the communication between said interrogation antenna and said tag antenna is accomplished by means of RF near-field magnetic coupling that is produced between the two said antennas.

11. The system as specified in claim 10 wherein said RFID tag operates at a frequency of 13.56 MHz or 6.78 MHz ISM band which are allocated and controlled by a government RF frequency regulating agency.

12. The system as specified in claim 6 wherein said RFID tag is encapsulated in a non-toxic, heat resistant material.

13. The system as specified in claim 6 wherein said RFID tag includes anti-collision features.

14. The system as specified in claim 6 wherein the components of said system with the exception of said interrogation antenna and said tag antenna are located outside of said heating implement.

15. A controlled cooking system that monitors, measures and control the internal temperature of food being cooked or baked, said system comprising:
a) a power switch having:
(1) an input connected to an a-c power source,
(2) an a-c output,
b) an a-c to d-c power supply having:
(1) an input that receives the –ac output from said power switch,
(2) a d-c output,
c) a power control relay having:
(1) a first input that receives the a-c output form said power switch,
(2) a second input,
(3) an a-c output,
d) an electric gas solenoid valve having:
(1) a first input that is applied the a-c output from said power control relay (2) a second input,
(3) a gas input
(3) a gas output,
e) a set of gas burners that are applied the gas output, wherein the heat produced by said gas burners are used to cook the food that is placed into the cooking implement,
f) a microprocessor having:
(1) a firmware program that controls the operation of said microprocessor,
(2) a first input applied from said a-c to d-c power supply
(3) a second input,
(4) a third input,
(5) a first output that produces a power control signal that is applied to said power control relay,
(6) a second output applied to said electrical gas solenoid valve,
(7) a third output consisting of a display activation signal,
(8) a fourth output consisting of a cooking terminated/alert signal applied to said alarm, and
g) an interrogator having:
(1) an interrogation antenna,
(2) an input,
(3) a first output consisting of a RF signal that is emitted from said interrogation antenna,
(4) a second output consisting of an interrogated data signal that is applied to the second input of said microprocessor,
h) a Radio Frequency Identification (RFID) tag that is buried into a food that is to be cooked, said RFID tag comprising:
(1) a tag antenna that receives the RF signal from said interrogator,
(2) an output consisting of a temperature encoded RF backscatter signal emitted from said tag antenna and received by said interrogator,
i) a display that displays alpha-numeric data pertaining to the identification of the food being cooked or baked and the level of preparation from rare to well done, wherein said display is activated by the second output from said microprocessor,
j) an alarm situated locally or remotely that produces an audible sound when the food in the heating implement has been fully cooked or baked, wherein said alarm is activated by the third output from said microprocessor, and
k) a keypad connected to the third input on said microprocessor, wherein said keypad having means for selecting various foods by their name, as programmed in said microprocessor.

16. The system as specified in claim 15 wherein said gas source is comprised of either a utility gas source or a portable gas source.

17. A controlled cooking system that monitors, measures and controls the internal temperature of foods being cooked or baked, said system comprising:
a) means for automatically turning on and off a power source to control the application of a heat source applied to a cooking implement, wherein when the power source is turned-on, food placed into the cooking implement is heated and cooked,
b) a passive Radio Frequency Identification (RFID) tag having an integral temperature sensor, wherein said RFID tag is buried into the food that is being cooked or baked, said RFID tag having means for receiving, energizing and enabling RF signals and means for automatically producing an output comprising a back-scatter signal containing encoded temperature data indicative of the internal temperature of the food being cooked or baked, c) an interrogator having:
 (1) means for producing the RF signals that energizes and enables said RFID tag,
 (2) means for receiving an encoded temperature signal from said RFID tag,
 (3) means for producing an interrogated data signal that includes decoded temperature data, d) a microprocessor having a programmed temperature data that is indicative of the internal temperature required to optimally cook a particular food, wherein when the decoded temperature data applied from said interrogator is below the programmed temperature, said microprocessor allows said power source applied to said cooking implement to remain on, conversely when the decoded temperature data is equal to or exceeds the programmed temperature, said microprocessor shuts off the power source, thus terminating the cooking cycle;

e) a display that is enabled by said microprocessor, wherein said display circuit is designed to display the preset numeric temperature, the identification of the food being cooked or baked and the desired state of the food from rare to well done as selected by a user, and f) an alarm that is enabled by a third output from said microprocessor, wherein said alarm produces an audible sound produced by a local or remote device.

* * * * *